(12) United States Patent
Pierce

(10) Patent No.: US 11,858,390 B2
(45) Date of Patent: Jan. 2, 2024

(54) HYGIENIC HEADREST COVER AND HYGIENIC KIT FOR VEHICULAR SEATS WITH HEADRESTS AND TRAY TABLES

(71) Applicant: Thomas Pierce, Kohler, WI (US)

(72) Inventor: Thomas Pierce, Kohler, WI (US)

( * ) Notice: Subject to any disclaimer, the term of this patent is extended or adjusted under 35 U.S.C. 154(b) by 86 days.

(21) Appl. No.: 18/078,381

(22) Filed: Dec. 9, 2022

(65) Prior Publication Data

US 2023/0115359 A1 Apr. 13, 2023

Related U.S. Application Data

(63) Continuation-in-part of application No. 17/389,021, filed on Jul. 29, 2021, now Pat. No. 11,528,996, and a continuation-in-part of application No. 16/838,783, filed on Apr. 2, 2020, now Pat. No. 11,110,835, and a continuation-in-part of application No. 16/430,826, filed on Jun. 4, 2019, now Pat. No. 10,638,845, and a continuation-in-part of application No. 15/357,292, filed on Nov. 21, 2016, now abandoned.

(51) Int. Cl.
*B60N 2/60* (2006.01)
*A47C 7/62* (2006.01)

(52) U.S. Cl.
CPC ............ *B60N 2/6063* (2013.01); *A47C 7/386* (2013.01)

(58) Field of Classification Search
CPC ........ B60N 2/80; B60N 2/6063; B60N 3/002; B64D 11/0647; A47C 7/386; A47C 31/007; A47C 31/113; A47G 11/003
See application file for complete search history.

(56) References Cited

U.S. PATENT DOCUMENTS

| | | | | |
|---|---|---|---|---|
| D655,543 S | * | 3/2012 | Beck | D6/518 |
| 2007/0257533 A1 | * | 11/2007 | Resendez | B60N 2/6063 297/228.11 |
| 2013/0320720 A1 | * | 12/2013 | Steinmetz | G09F 23/06 297/219.1 |
| 2016/0022054 A1 | * | 1/2016 | Griffin | A47C 31/11 297/228.11 |

\* cited by examiner

*Primary Examiner* — Milton Nelson, Jr.
(74) *Attorney, Agent, or Firm* — Melvin K. Silverman

(57) ABSTRACT

A hygienic cover, hygienic kit, and a method thereof for a hygienic seat location including a stretchable antimicrobial hygienic headrest cover having an ability to conform itself to dimensions of the existing headrest. The cover comprises a stretchable, antimicrobial, a non-mesh fabric configured to provide a barrier between a user and the headrest. The headrest has an elastic opening in the back surface allowing the fabric to stretchily fit over an existing headrest. A tray table cover defined by a top panel, a bottom panel, and a sidewall connecting said top and bottom panels thereby creating an opening to a cavity therein is included. A pre-packaged sanitizing wipe is included to sanitize the seating location, and a container is included to encapsulate the pre-packaged sanitizing wipe, the tray table cover, and the stretchable headrest cover, wherein the headrest cover and the tray table cover are compressed.

15 Claims, 13 Drawing Sheets

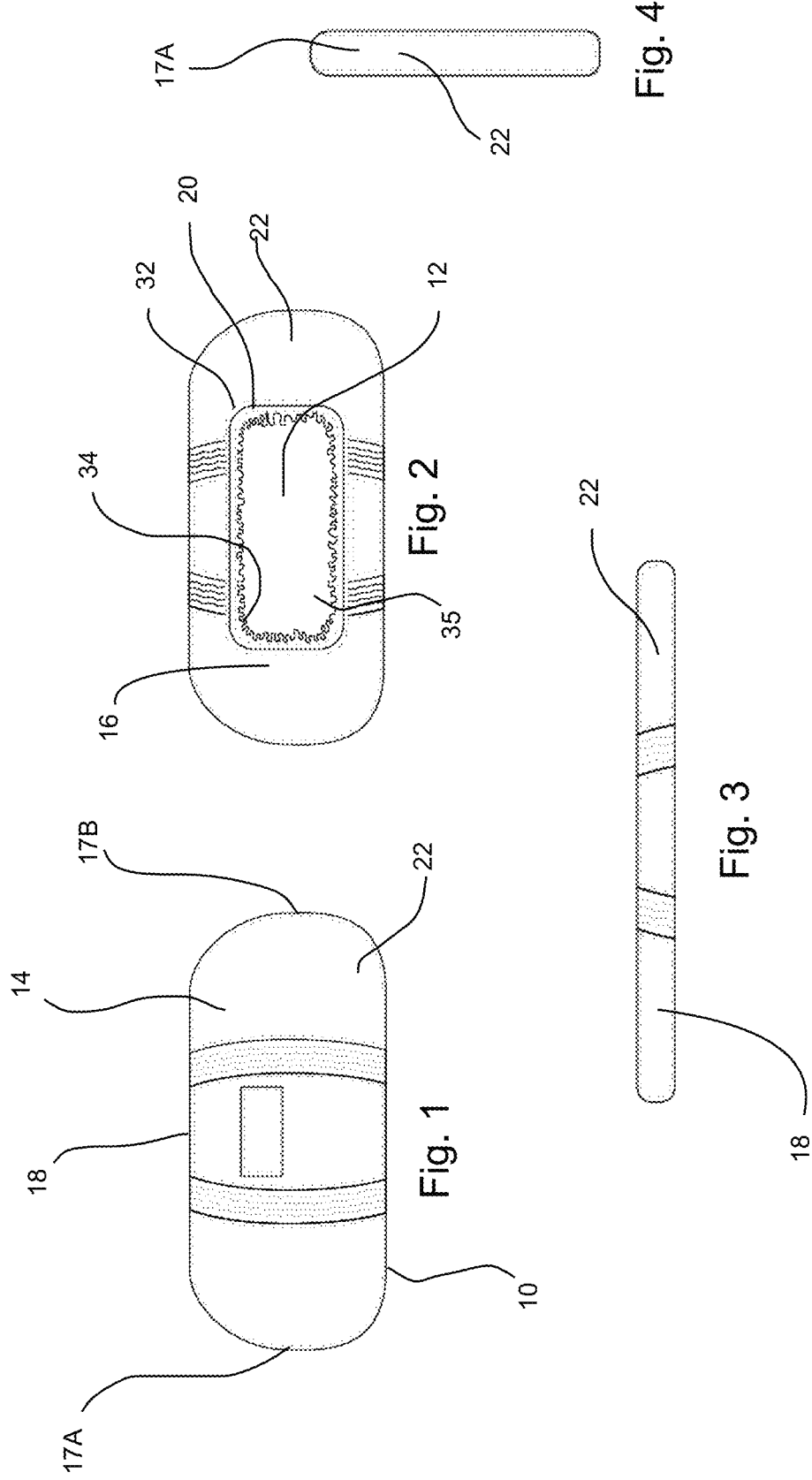

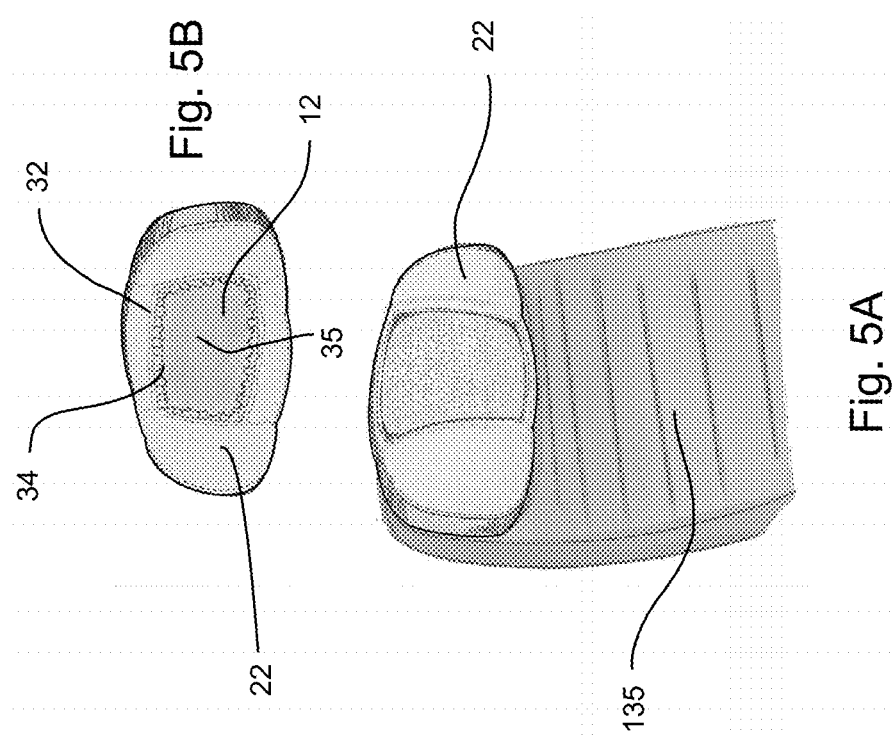

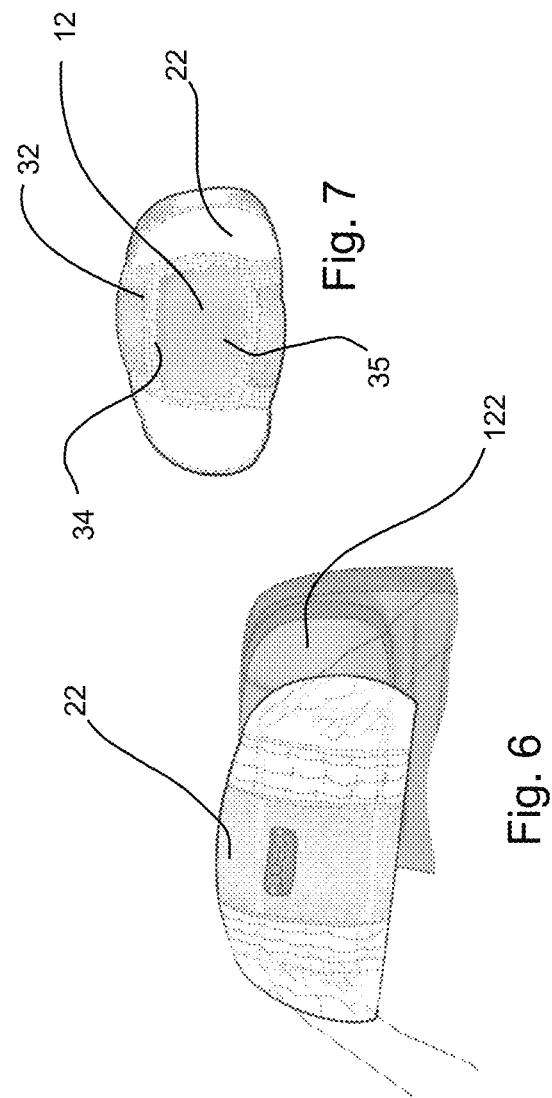

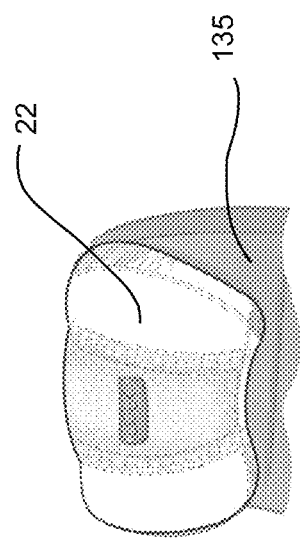
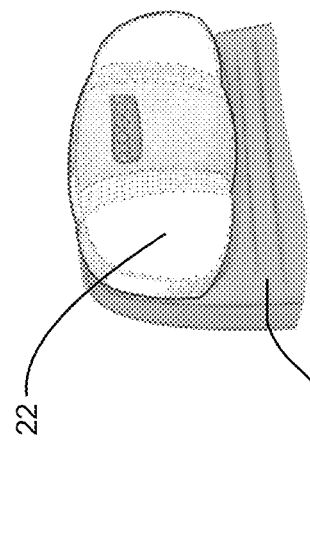

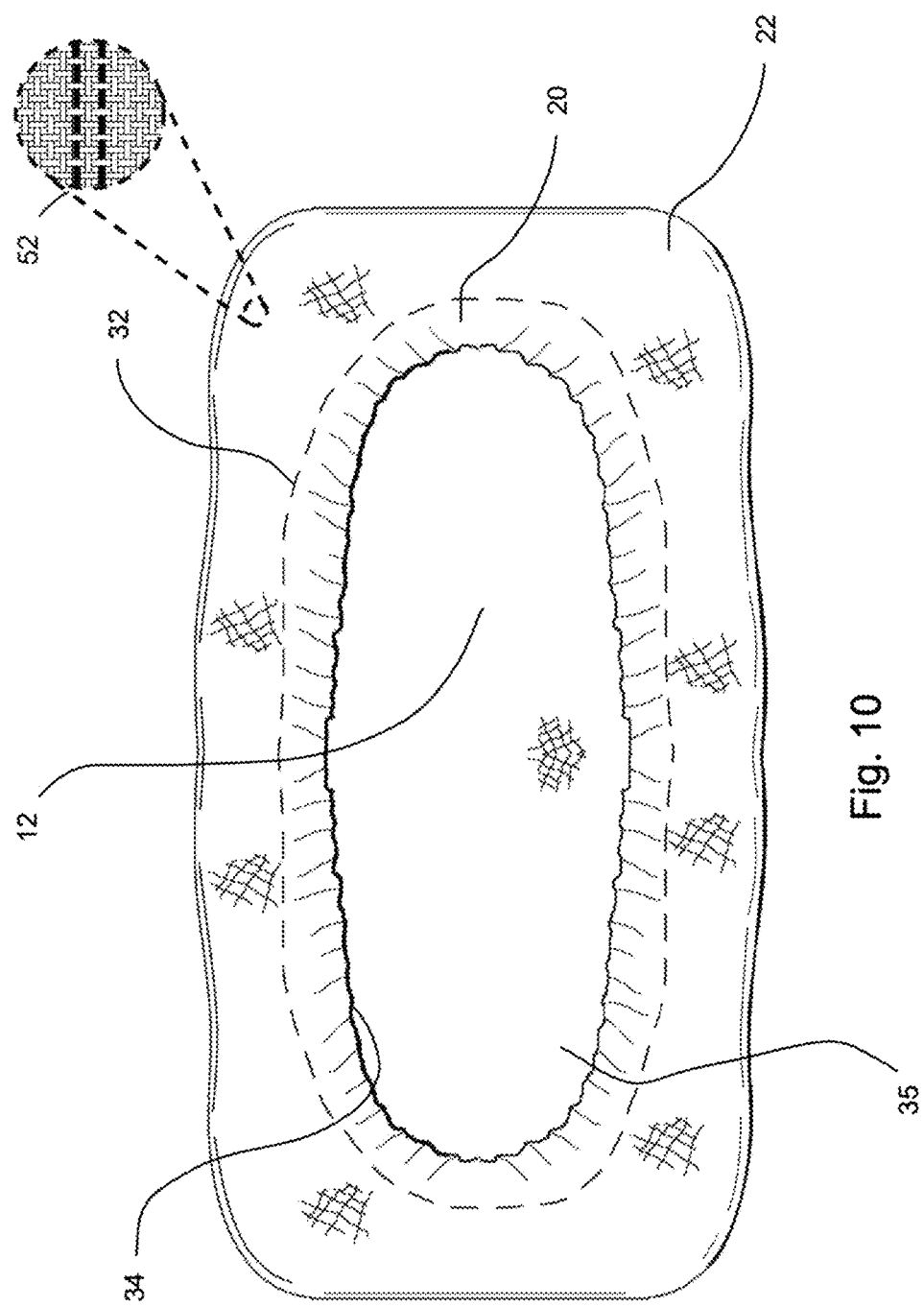

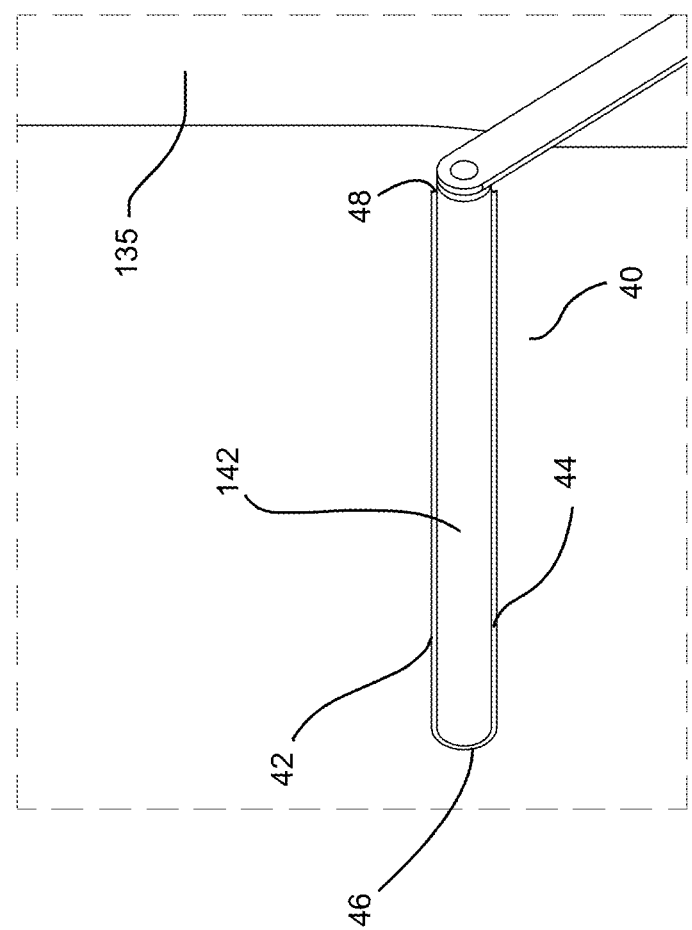

HYGIENIC HEADREST COVER AND HYGIENIC KIT FOR VEHICULAR SEATS WITH HEADRESTS AND TRAY TABLES

REFERENCE TO RELATED APPLICATION

This application is a continuation in part of co-pending application Ser. No. 17/389,021, filed Jul. 29, 2021, which is a continuation in part of Ser. No. 16/838,783, filed Apr. 2, 2020, now U.S. Pat. No. 11,110,835, issued Sep. 7, 2021, which is a continuation in part of Ser. No. 16/430,826, filed Jun. 4, 2019, now U.S. Pat. No. 10,638,845, issued May 5, 2020, which is a continuation in part of application Ser. No. 15/357,292, filed Nov. 21, 2016, now abandoned, which claims the benefit under 35 USC 119(e) of provisional patent application Ser. No. 62/258,157, Filed Nov. 20, 2015, all of which are incorporated by reference in its entirety.

BACKGROUND OF THE INVENTION

1. Field of the Invention

The present invention relates to hygienic kits including headrest covers, sanitary wipes, and tray table covers for vehicles inclusive of airplanes, trains, and other vehicles that include seating with headrests and tray tables, in addition to other seats with detached or separated headrests, including cinema seats.

2. Description of the Related Art

For purposes of illustration, most references made herein are to the use of headrest and tray table covers on airline carriers, but the invention applies to all forms of transportation, public conveyances, and facilities in both commercial and residential settings, i.e., buses, trains, boats, automobiles, medical/dental facilities, entertainment venues, offices, homes and the likes that include seating with a head rest and a tray table.

Ever since the introduction of the headrest portion of a seat on transportation vehicle seats, and more recently on cinema theaters, the issue of the headrest becoming soiled and potentially contaminated by constant contact with multiple occupants has been a concern to respective industries, health agencies, and the informed general public. This concern is especially acute on long transit transportation and cinema theaters where the seat occupants constantly rub their scalps against the headrest while assuming a more relaxed position. Such continuous contact with the headrest results in it quickly becoming soiled, creating a potentially unsanitary surface, which may act as a conduit to transfer contaminants to subsequent occupants.

Further, the increased interest in sanitary surfaces as a result of pathogens and viral transmissions has created a need for products containing a barrier to an otherwise unclean surface.

High traffic surfaces harbor microorganisms that can contaminate a multitude of people. The present invention is designed not only to prevent possible soiling of the head-rest portion of a seat, but also the possibility of transmission of scalp, skin, parasitic and other diseases from any of the many previous users of the seat to another user. This possibility of transmission increases due to the fact that most people, in many high traffic and crowded settings, use the headrest portion of seats as handle bars. They are used as leverage to get in, out and up from seats, as balancing tools while moving down the aisle or simply as a place to set ones hands while standing, chatting, or waiting to disembark.

Throughout the useful life of commercial airplanes and cinema theaters, seats can often be occupied by thousands of different individuals of various degrees of cleanliness and health conditions before seats are ever cleaned, replaced, or reupholstered. In many cases, the cleaning process might not sufficiently sanitize the headrest. Most health agencies cite international travel as a major factor in the global spread of contagious diseases. If headrest surfaces are not consistently cleaned after each occupant, the seats can potentially expose a multitude of future occupants to serious health hazards which could later be transferred and spread across entire communities.

Resting one's head on the headrest of an unprotected public seat could be the equivalent of resting ones head on a hotel pillow that has been used by multiple individuals, without changing the pillow casing. No one well informed of the potential risk and consequences would willingly rub their head against a stranger's scalp, much less with that of the hundreds of individuals with different degrees of hygiene and unknown health conditions that have used the seat before them. For these reasons alone, it might be concluded that in an effort to reduce or control the effects of a potential pandemic, public conveyances and entertainment venues might appropriately be required to provide sanitized covers after each leg of travel and prior to every show-time, respectively. If such a mandate were to be imposed today, many public carriers would be under prepared to comply with such a directive. Many transportation carriers would not be able to absorb the time and financial burden required in complying with such a legal requirement, and those industries that did, would likely pass the incremental cost directly onto the customers.

The airline industry and other agencies have long sought alternative means for efficiently addressing said problems without imposing further stress on an industry already under economic pressures. One reason airlines do not provide protective covers to passengers is the fact that most, if not all presently available headrest covers, are too costly to provide. They require extensive handling and are considered invasive to the seat, often requiring attachment elements to be previously and/or permanently embedded onto the seats.

An even more deterrent factor materializes with the use of presently available reusable headrest covers. The reusable versions of headrest covers are primarily made of cloth, leather, or towel like material. The laundering of such covers is an expensive operation, requiring additional handling for packaging and transporting it to and from the processing locations. The life time replacement cycle for reusable covers primarily depends on how often they are cleaned, as the laundering process deteriorates the fabric, its texture, and its colors.

In summary, a number of issues presently face carriers when using any of the currently available headrest covers and it becomes apparent that these issues are major deterrents to the consistent use of headrest covers. These issues include: the cost to purchase; the cost to incorporate required engagement elements onto existing and new seats; the labor cost required to implement a one cover per passenger cycle; the cost of replacing all covers after each individual use; the cost of discarding fresh covers, not being able to distinguish the used from the new covers; the cost of shipping, laundering, storing and handling of reusable covers; the cost associated with potential delays to flight schedules contribute an unnecessary burden on industries already in distress.

The above harmful impact to use frequency for headrest covers therefore obscures a cover's ultimate function: to protect individuals and communities from potential contamination. In addition to protection, the use of headrest covers provides the concerned public with an added advantage; namely, user peace of mind. Once again in summary, all reusable and disposable replaceable headrest covers previously developed, suffer from a number of critical disadvantages that hinder the consistent use of said covers.

Research indicates that one convenient solution for such a critical and global dilemma would be to make available to applicable industries and the general public, an economical, replaceable, compact, disposable headrest cover that can be installed and removed easily and disposed of by the seat occupants themselves. If the travel community and general public have not yet publicly raised concerns, it is mainly because they are uninformed about such facts.

To minimize the potential for transmission of any virus, skin condition, or communicable diseases, the headrest cover should be available on a consistent basis. International carriers can be a major factor in the spread of a disease globally. Getting ill while aboard an airplane is a serious matter. From the common cold to more serious infections, air passengers are more exposed to germs and viruses than ever before. High traffic surfaces harbor microorganisms that can contaminate a multitude of people. The present invention is designed not only to protect against soiling of the head-rest portion of the seat, but also the possibility of transmission of scalp, skin and other diseases from any prior user of the seat to others.

Representative prior art in patents is reflected in U.S. Pat. No. 3,654,059 (1972) to Zisblatt; U.S. Pat. No. 7,726,735 (2010) to Resendiz; and U.S. Pat. No. 8,191,969 (2012) to Dermaris.

SUMMARY OF THE INVENTION

The invention herein provides a hygienic kit for a hygienic seat location, including a stretchable antimicrobial hygienic cover, for utilization with an existing variable geometry vehicle headrest, having an ability to conform itself to dimensions of the existing variable geometry vehicle headrest underlying the stretchable hygienic cover when engaged, wherein the stretchable hygienic cover comprises a stretchable, antimicrobial, a non-mesh fabric configured to provide a barrier between a user and said existing variable geometry vehicle headrest, an elastic opening in said back surface allowing said fabric to stretchily fit over an existing variable geometry vehicle headrest, wherein said elastic opening configurable to stretch in size to fit over said existing variable geometry headrest and retract in size to grip on to an existing variable geometry vehicle headrest.

Further included is a plurality of antimicrobial metallic threads interwoven within the non-mesh fabric, thereby providing a barrier layer within the non-mesh fabric configured to stop microorganisms from advancing from an interior surface through to an outer surface of the stretchable antimicrobial hygienic cover, thereby containing the microorganisms to an interior side of the stretchable antimicrobial hygienic cover.

The invention further provides a tray table cover, wherein said tray table cover is defined by a top panel, a bottom panel, and a sidewall connecting said top panel and said bottom panel along three sides of a square geometry thereby creating an opening to a cavity therein. A pre-packaged sanitizing wipe is included to sanitize the seating location, and a container is included to encapsulate the pre-packaged sanitizing wipe, the tray table cover, and the stretchable hygienic cover, wherein the stretchable hygienic cover and the tray table cover are compressed.

Additionally disclosed is a method for providing a hygienic kit for a hygienic seat location. The method includes providing a stretchable antimicrobial hygienic cover, for utilization with an existing variable geometry vehicle headrest, having an ability to conform itself to dimensions of the existing variable geometry vehicle headrest underlying the stretchable hygienic cover when engaged, wherein the stretchable hygienic cover comprises a stretchable, antimicrobial, breathable moisture-absorbent fabric, an elastic opening in said back surface allowing said fabric to stretchily fit over an existing variable geometry vehicle headrest, wherein said elastic opening may stretch and retract in size to grip on to an existing variable geometry vehicle headrest. The method further includes using a non-mesh fabric to act as a barrier between a variable geometry headrest and a user's scalp, wherein a plurality of antimicrobial metallic threads are interwoven within the non-mesh fabric, thereby providing the barrier within the non-mesh fabric to stop microorganisms from advancing from an interior surface through to an outer surface of the stretchable antimicrobial hygienic cover, thereby containing the microorganisms to an interior side of the stretchable antimicrobial hygienic cover.

The method further calls for providing a tray table cover wherein said tray table cover is defined by a top panel, a bottom panel, and a sidewall connecting said top panel and said bottom panel along three sides of a square geometry thereby creating an opening to a cavity therein. The method also calls for providing a pre-packaged sanitizing wipe and providing a container to encapsulate the pre-packaged sanitizing wipe and the stretchable hygienic cover, wherein the stretchable hygienic cover is compressed.

The invention herein also provides a hygienic cover for a headrest. The hygienic cover comprises a stretchable antimicrobial hygienic cover for utilization with an existing variable geometry vehicle headrest, the stretchable hygienic cover having an ability to conform itself to dimensions of the existing variable geometry vehicle headrest underlying the stretchable hygienic cover when engaged, wherein the stretchable hygienic cover comprises a stretchable, antimicrobial, non-mesh fabric configured to provide an barrier between a user and the existing variable geometry vehicle headrest, an elastic opening in a back surface allowing the fabric to stretchily fit over the existing variable geometry vehicle headrest, wherein the elastic opening configurable to stretch in size to fit over the existing variable geometry headrest and retract in size to grip on to the existing variable geometry vehicle headrest.

The hygienic cover for a headrest also includes a plurality of antimicrobial metallic threads interwoven within the non-mesh fabric, thereby providing a barrier layer within the non-mesh fabric configured to stop microorganisms from advancing from an interior surface through to an outer surface of the stretchable antimicrobial hygienic cover, thereby containing the microorganisms to an interior side of the stretchable antimicrobial hygienic cover.

It is an object of the invention to provide for proper sanitation of otherwise unprotected public seats and seats in public carriers.

It is another object to reduce the transmissibility of skin and other medical conditions that can be transmitted by human contact.

The invention addresses a long standing need that all prior efforts have failed to adequately resolve, including the impact a cover's cost per unit, the need to make covers easy and quick to install and remove, the need to reduce the amount of handling by service personnel, the need to make covers available to individual seat occupants, the need for covers in all public seating; the need to make covers widely available; and the need for making covers available in compact and convenient packaging.

An outstanding aspect of the present invention is that the general public only be provided with an alternative for protecting themselves from potential contamination without relying on commercial carriers, cinema theaters, or others to do so for them.

BRIEF DESCRIPTION OF THE DRAWINGS

FIG. 1 is front view of the hygienic headrest cover.
FIG. 2 is a back view of the hygienic headrest cover.
FIG. 3 is top view of the hygienic headrest cover.
FIG. 4 is a side view of the headrest cover.
FIG. 5A is a perspective front view of a unitary headrest cover engaged on a seat with headrest.
FIG. 5B is a perspective back view of the headrest cover shown in FIG. 5A.
FIG. 6 is a perspective front view of a user placing a headrest cover with internal bands on a headrest.
FIG. 7 is a perspective back view of the hygienic headrest shown in FIG. 6.
FIG. 9A is a view of the headrest cover shown in FIGS. 1-4 engaged on a seat headrest with a particular geometry.
FIG. 9B is a perspective front view of the headrest cover shown in FIGS. 1-4 engaged on a seat headrest with another particular geometry.
FIG. 10 is an enlarged back view of the hygienic headrest cover.
FIG. 17 is a cross-sectional side view of a tray table cover of the kit engaged on to a tray table.

DETAILED DESCRIPTION OF THE INVENTION

Figure 8:
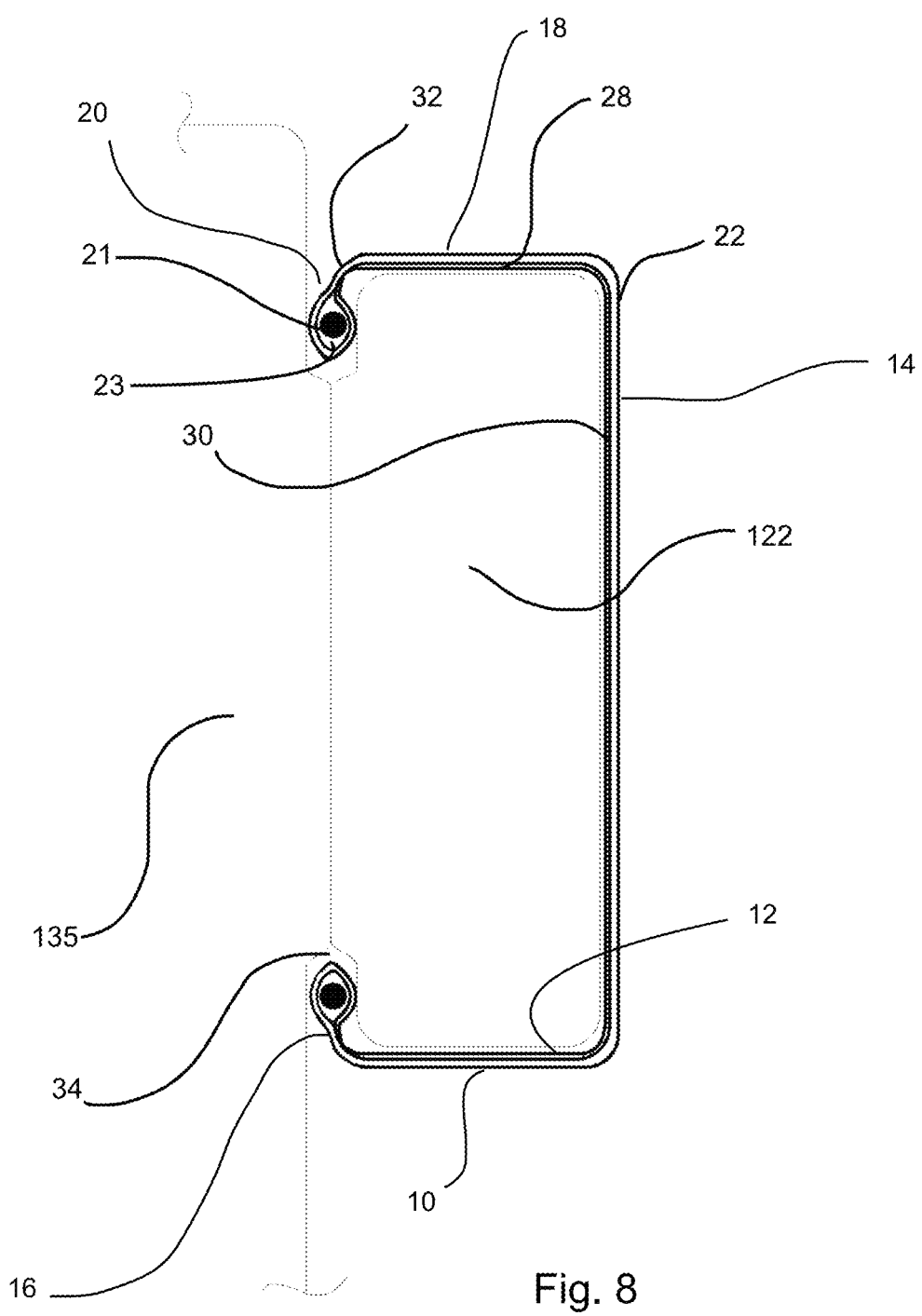
FIG. 8 is a cross-sectional view of the headrest cover shown in FIGS. 1-4, engaging on a headrest of a seat.

The invention, shown primarily in FIGS. 1-4, is a headrest cover for use with the headrest portion of a vehicle seat as shown in FIG. 5A. As noted, vehicles of all different types come with headrests. In particular, airplanes may have a protruding headrest, as shown in FIGS. 6 and 8. As passengers travel in the seats, the headrest becomes soiled with microbial and particulate matter from previous passengers. The invention seeks to mitigate the risk of contacting a soiled headrest by providing a protective barrier between the scalp of a passenger and the surface of the headrest.

The invention is constructed to allow stretchability by using a form-fitting fabric, such as nylon or lycra. However, other materials may be used too, such as neoprene. The headrest cover is constructed into a unitary piece that does not require straps or clips, as most of the prior art does. Instead, the headrest cover envelops the headrest and clings to the sides, thereby taking the shape of the underlying headrest, as shown in FIGS. 9A and 9B. This also benefits the production of the headrest to simplify and expedite the process.

The material of the headrest should also be an antimicrobial, hypoallergenic, moisture wicking material. The present invention solves this by incorporating antimicrobial threads through out the headrest fabric, such as copper, or in some embodiments, silver. Further, the material should not be made of mesh, or any material that may expose a user's scalp to the surface of the headrest, either directly or indirectly. The material should form a protective barrier between the scalp and headrest. In some embodiments, this protective barrier is formed from a plurality of these metallic antimicrobial fibers, whereby the fibers kill microbes and bacteria before they can traverse through the fabric of the headrest. Use of these fibers forms a barrier that is virtually impenetrable for microbes and bacteria, but allows the fabric to have enhanced breathability over covers with a solid liner, while accomplishing the same or significantly the same outcome.

The instant invention ideally uses a breathable, stretchable, moisture absorbable fabric, such as a Terry or Jersey-knit fabric having therein a percent of lycra-spandex to give the fabric form-fitting properties, and a metallic antimicrobial thread. A polyester or polypropylene fabric may be employed at a lower cost, if breathability or skin irritation is a lesser concern. However, cotton-based fabrics lend themselves to comfort and the use of printing of more complex fonts and pleasing patterns on the surface thereof without the use of potentially irritating inks. The material of the headrest cover itself should be configured for use as either disposable or readably washable.

Figure 11:
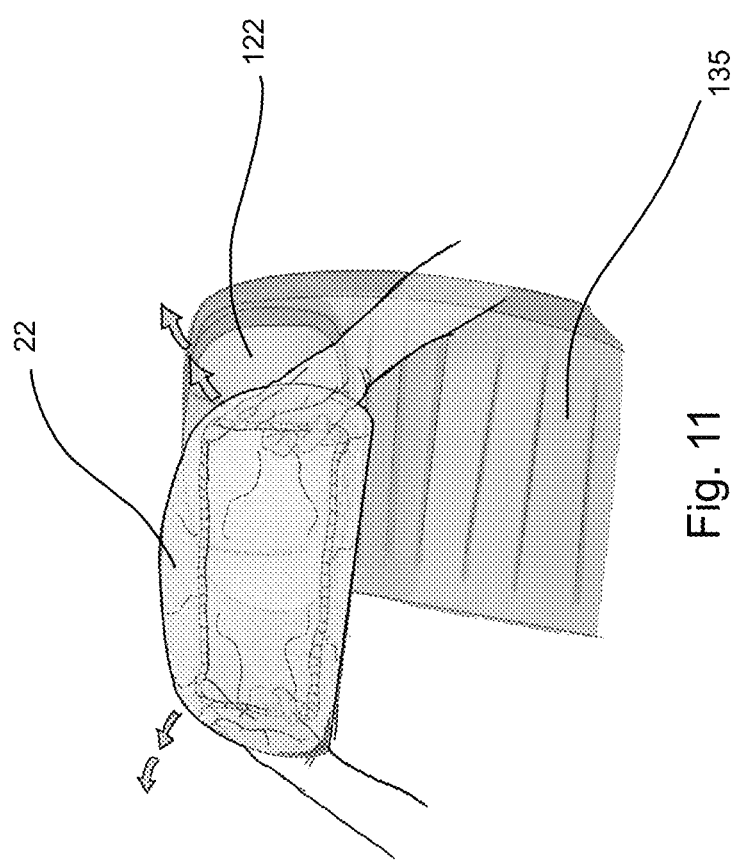
FIG. 11 is a perspective view showing a user fitting a headrest cover on to a headrest of a seat.

The headrest comes with an opening on the backside, as shown in FIGS. 2 and 10, where a user will be able to stretch the opening large enough to maneuver the headrest in to the interior of the headrest cover, as shown in FIG. 11. Upon a user's release of the opening, the opening will contract back to a smaller diameter, fitting snug against the front, sides, and rear of the headrest. In an ideal embodiment, the opening contains an elastic material to actuate the closure of the opening in such a way that it will also engage the back of the headrest, shown in FIG. 8 (and as may be appreciated by viewing he opening shown in FIG. 2), which no prior art has disclosed. That is, the opening will contract and create a form-fitting surface on the rear of the headrest for better securement of the cover. This creates a tight-fit cling to a headrest's top, bottom, front, back, and left and right sides. Because the material clings to the headrest's dimensions, it does not require additional adjustment of the headrest cushion, or the use of clips, straps, or strings. Prior art requires that the cushion is positioned or manipulated to allow engagement of a cover of the prior art. However, with headrests such as on airplanes, the headrests are still fixed to the seat and cannot be moved such as an automobile's seat. Therefore, the present invention provides a universal ability to engage with more rear-mounted headrests than the prior art.

As may be seen in FIGS. 2, 5B, 7, and 10, it may be advantageous to include a hem 32 that encloses a closure means 20—such as an elastic band, drawstring, or chord— near the periphery of the opening 34 to assure that the cover 22 is initially positioned completely over the headrest, as shown in FIG. 5A.

In an ideal embodiment, an elastic band as a closure means 20 exists inside the circumferential pocket 23 created by the hem 32. The closure means allows a user to place the headrest cover 22 around the headrest 122, and secure the cover 22 to the rear side of the headrest (shown in FIG. 8). The elastic band as a closure means 20 will allow a user to stretch the opening over the headrest, and once engaged, the elastic band will contract offering a snug fit. Further, an elastic material may be heat bonded to the opening 34 of the headrest cover, thus negating the need for a hem 32 and pocket 23.

In addition to a headrest cover, a user should also disinfect the headrest as well as the entire seating area prior to use. Before engaging the present headrest cover, the uncovered headrest 122 and entire seat 135 should be swathed with an antibacterial product such as Wet Wipes. If a tray table is included in the seating area, that should be disinfected with said antibacterial product as well.

Figure 12:
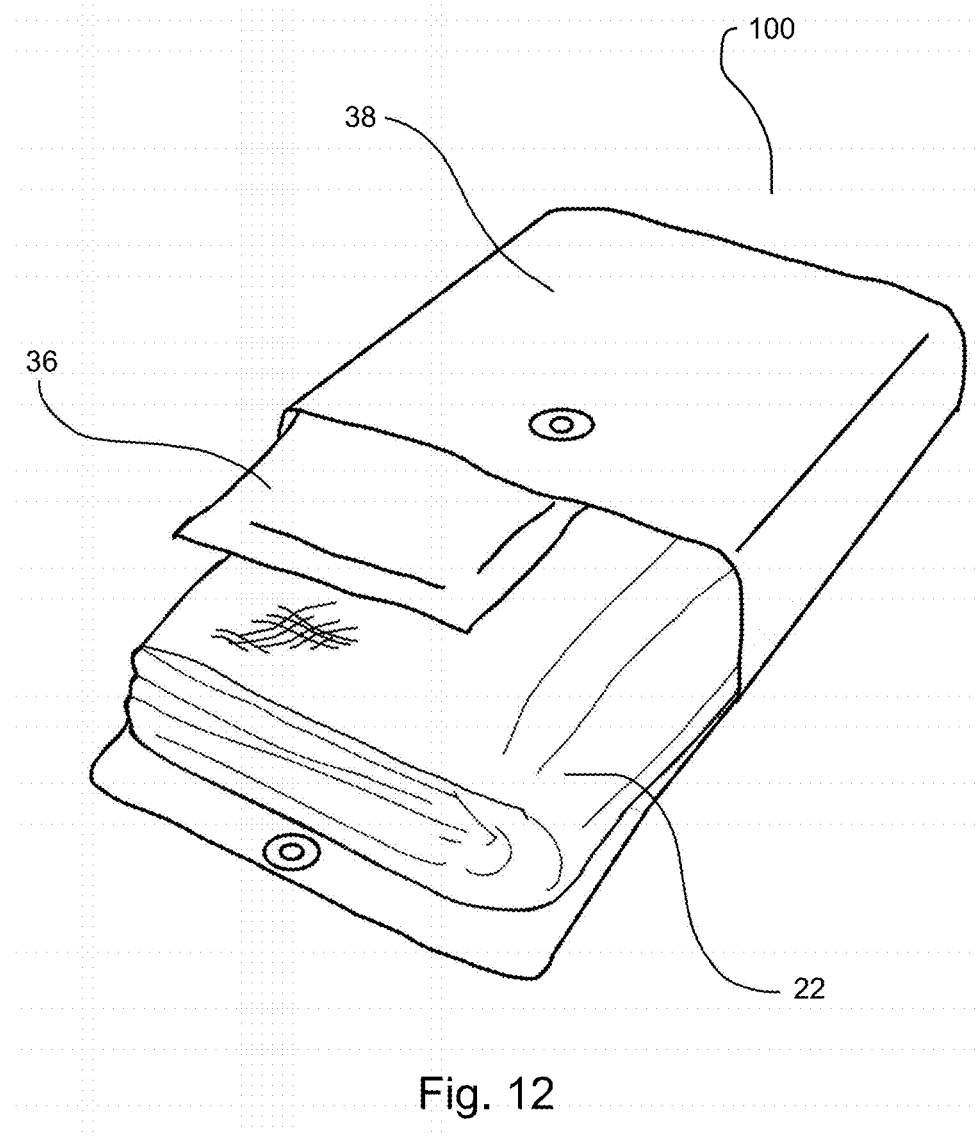
FIG. 12 is a perspective view of a kit having a folded headrest cover and disinfecting wipe.

FIG. 12 includes a kit 100/102 that will employ a folded hygienic cover 22, and a sanitary wet wipe 36 inside a container 38. The container can be reusable hardened plastic, or disposable plastic packaging. The headrest cover may also be either reusable or disposable.

Figure 13:
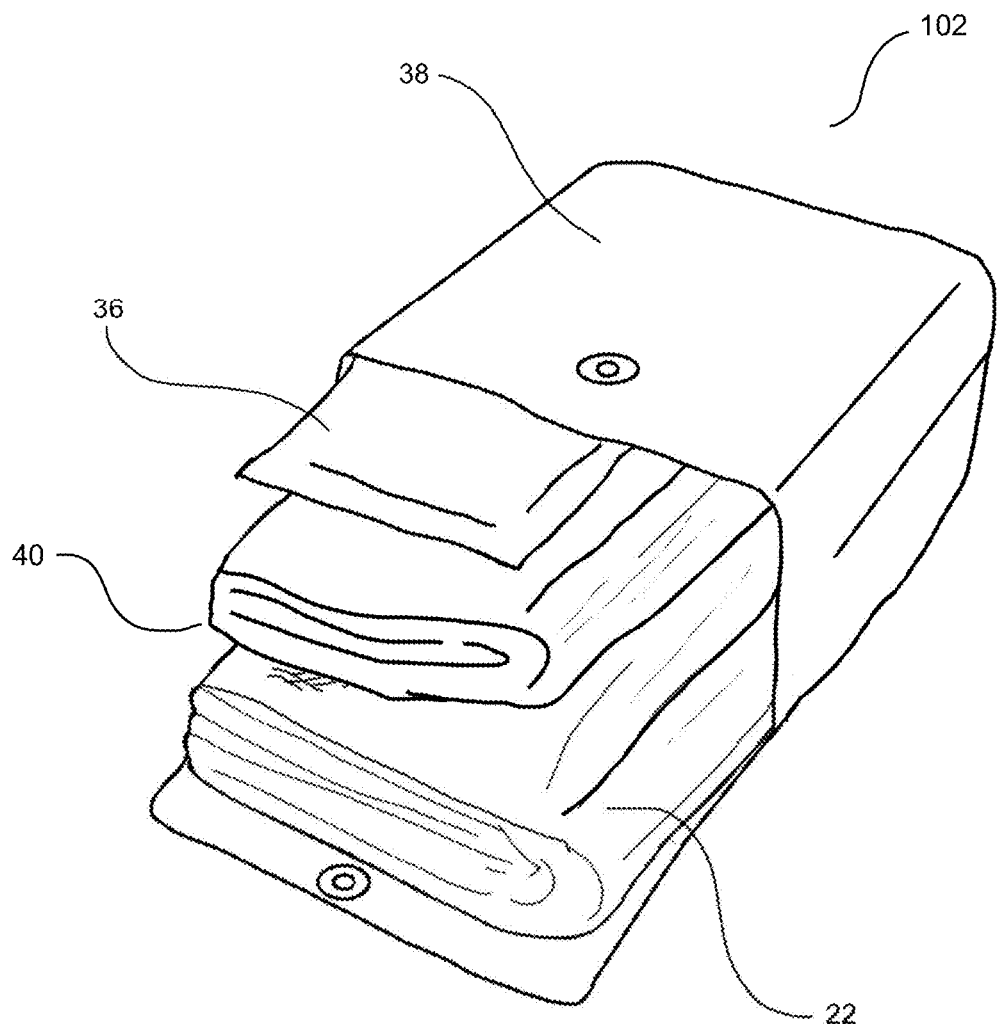
FIG. 13 is a perspective view of a kit having a folded headrest cover, folded tray table cover, and a disinfecting wipe.
Figure 14:
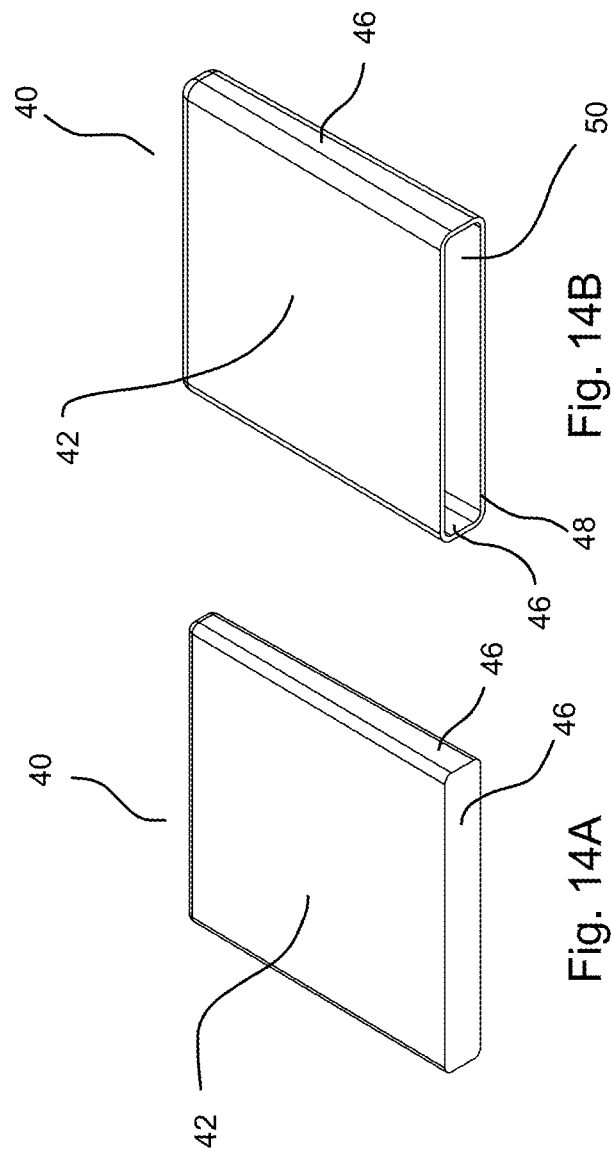
FIG. 14A is a perspective front view of a tray table cover of the kit.
FIG. 14B is a perspective rear view of a tray table cover of the kit.

In some embodiments, the kit 102 also includes a cover for a tray table 142 in a material such as plastic or silicone. The tray table cover 40 is shown primarily in FIGS. 13-17. FIG. 13 is a perspective view of a kit 102 having a folded headrest cover 22, folded tray table cover 40, and a disinfecting wipe 36. As may be appreciated in FIGS. 14-17, the tray table cover 40 includes a top panel 42, bottom panel 44, and a side panel 46 that wraps around three-sides of the tray table 142 thereby leaving an open end 48 and forming a pocket with an internal cavity 50 for said tray table 142 to fit into. It is intended for the tray table cover 40 to be slip-fittable over a tray table 142 to provide a barrier between the user and the tray table 142.

FIG. 14A is a perspective front view of a tray table cover 40 of the kit 102, wherein the top 42, bottom panel 44, and side panel 46, may be seen. FIG. 14A is a perspective front view of a tray table cover 40 of the kit 102. An alternate view is provided in FIG. 14B, a perspective rear view of a tray table cover 40 of the kit 102. There, the opening 48 can be seen as well as the cavity 50 defined by the panels 44/46 and sidewall 46 therein.

Figure 15:
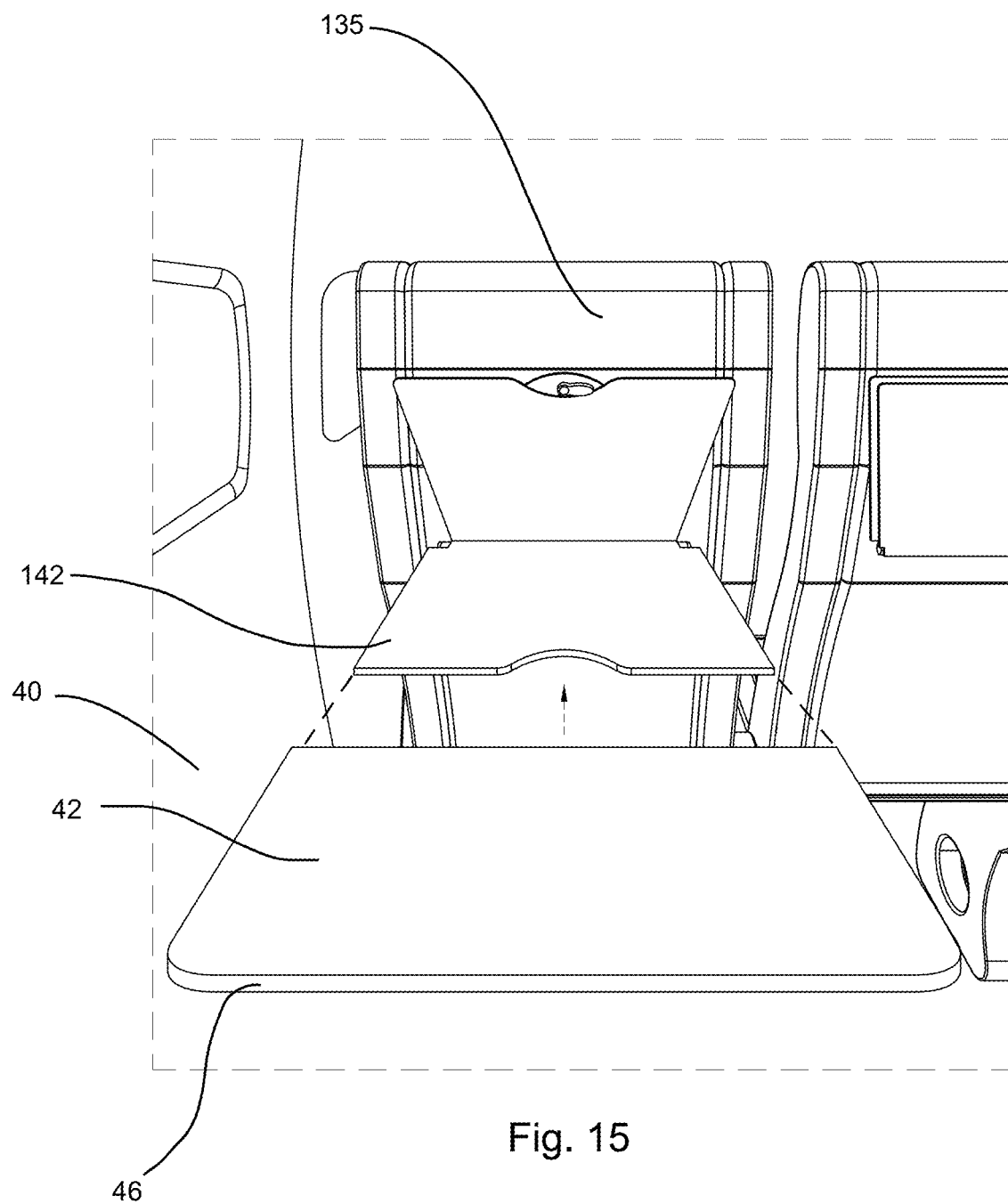
FIG. 15 is a perspective front view of a tray table cover of the kit showing the mode of engagement on to a tray table.
Figure 16:
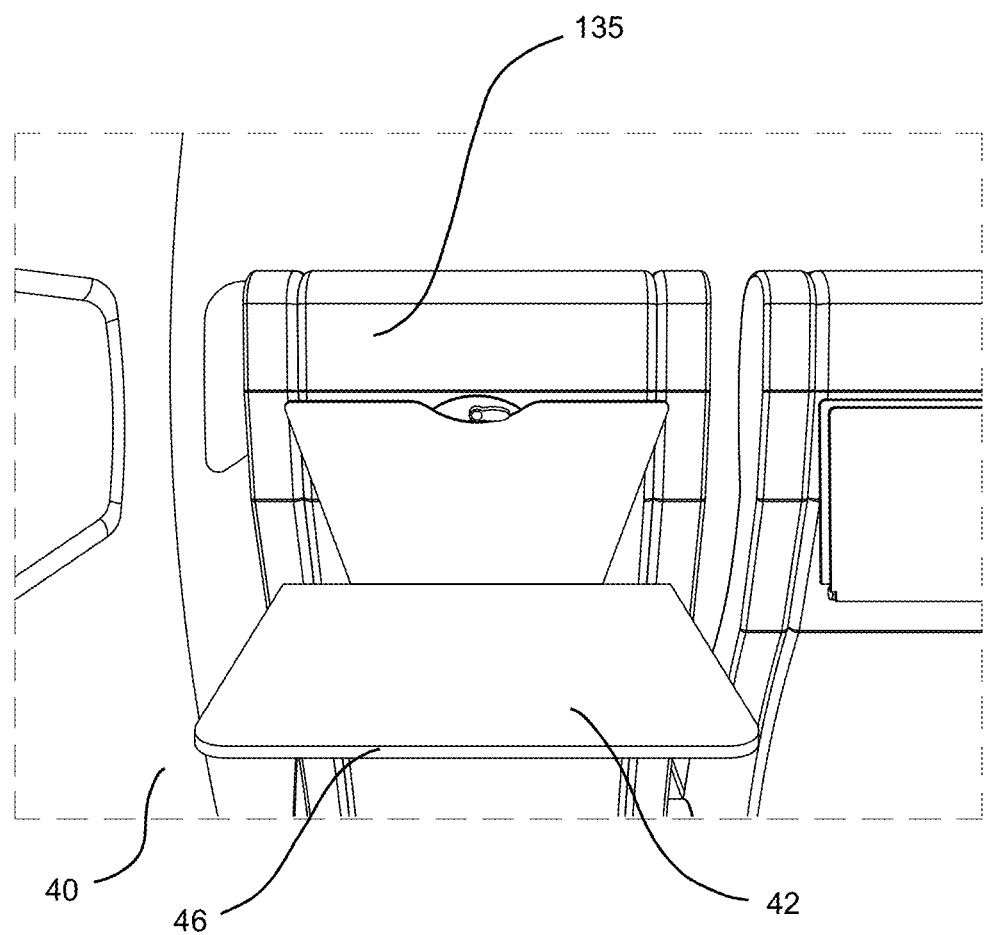
FIG. 16 is a perspective front view of a tray table cover of the kit engaged on to a tray table.

FIGS. 15, 16, and 17 show the engagement of the tray table cover 40 with the tray table 142. FIG. 15 is a perspective front view of a tray table cover 40 of the kit 102 showing the mode of engagement on to a tray table, wherein the tray table cover 40 slips over the tray table 142. FIG. 16 is a perspective front view of a tray table cover 40 of the kit 102 engaged on to a tray table (not shown in this figure). As may be appreciated, the tray table 142 is not visible in FIG. 16, as it is enveloped inside the tray table cover 40. FIG. 17 is a cross-sectional side view of a tray table cover 40 of the kit 102 engaged on to a tray table 142.

Some tray table covers 40 may be disposable and constructed of a poly, plastic, or solid nylon sheet. Some embodiments constructed of rubbers and stretchable silicone embodiments may exist. While materials of plastic may be static, materials of silicone and rubbers may be employed as a sturdier material, and may include a textured surface that is more desirable, such as a cloth surface or vinyl/polyurethane faux leather surface, however, these would be employed in reusable embodiments because of the cost of construction. While the tray table cover 40 is constructed to encapsulate the tray table 142, this would not bar embodiments from also employing other securement means, including clips, straps, tabs, or flaps near the open end, however, the dimensions and overall construction of the tray table cover 40 makes these additional securement means unnecessary.

An embodiment of the invention herein can be seen in FIGS. 1-17. The invention discloses a stretchable antimicrobial hygienic cover 22, for utilization with an existing variable geometry vehicle headrest 122, having an ability to conform itself to dimensions of the existing variable geometry vehicle headrest 122 underlying the stretchable hygienic cover 22 when engaged. The stretchable hygienic cover comprises a stretchable, antimicrobial, breathable moisture-absorbent non-mesh fabric, wherein the breathable moisture-absorbent fabric comprising a form-fitting fabric, and the stretchable form-fitting fabric allows for configurability to geometries of various headrests larger than that of the dimensions of an unstretched hygienic cover. The form-fitting fabric also includes a plurality of antimicrobial metallic threads 52, as shown in FIG. 10, interwoven within said non-mesh fabric, thereby providing a barrier layer within said non-mesh fabric configured to stop microorganisms from advancing from an interior surface through to an outer surface of said stretchable antimicrobial hygienic cover, thereby containing said microorganisms to an interior side of said stretchable antimicrobial hygienic cover. In some embodiments, these metallic threads 52 can may be silver or copper, with properties that kill microbes and bacteria.

The form-fitting fabric also includes elastic materials providing the ability to cling to the existing variable geometry vehicle headrest, thereby negating the necessity for straps and clips. This form-fitting fabric defines a front side 14, back side 16, top side 18, bottom side 10, left side 17A, and right side 17B, and thereby creating an interior surface 12, surrounding a cavity, wherein an existing variable geometry vehicle headrest 122 may occupy the space therein.

The invention also provides an elastic opening 35 defined by a periphery 34 in the back surface 16 allowing the fabric to stretchily fit over an existing variable geometry vehicle headrest 122, wherein the elastic opening 35 may stretch and retract in size to grip on to an existing variable geometry vehicle headrest 122. The elastic opening 35 is defined by a hem 32 around a rim of the opening 34 creating a concentric pocket 23 surrounding means for closure 20 that secure the opening 35 of the stretchable hygienic cover 22 to a back-portion of the existing variable geometry vehicle headrest 122. The elastic opening 35 may also include a concentric closure means 20 within the pocket 23 around the rim 34 of the opening 35 comprising a concentric elastic band 21 with a higher modulus of elasticity than the stretchable moisture-absorbent fabric.

In some embodiments, the elastic opening 35 includes a concentric closure means 20 around a rim 34 of the opening 35 comprises a heat-bonded elastic material with a higher modulus of elasticity than the stretchable moisture-absorbent fabric.

In some embodiments, the form-fitting fabric of the antimicrobial hygienic headrest cover 22 is constructed of a unitary fabric.

The invention also provides for a hygienic kit for a hygienic seat location, comprising a stretchable antimicrobial hygienic cover 22, for utilization with an existing variable geometry vehicle headrest 122, having an ability to conform itself to dimensions of the existing variable geometry vehicle headrest 122 underlying the stretchable hygienic cover 22 when engaged, wherein the stretchable hygienic cover 22 comprises a stretchable, antimicrobial, non-mesh fabric with interwoven antimicrobial metallic threads configured to provide a barrier between a user and the existing headrest, an elastic opening 35 in the back surface 16 allowing the fabric to stretchily fit over an existing variable geometry vehicle headrest 122, wherein the elastic opening 35 may stretch in size to fit over the existing headrest 122 and retract in size to grip on to an existing variable geometry vehicle headrest 122. The kit also includes a tray table cover 40, wherein said tray table cover 40 is defined by a top panel 42, a bottom panel 44, and a sidewall 46 connecting said top panel 42 and said bottom panel 44 along three sides of a square geometry thereby creating an opening 48 to a cavity 50 therein. The kit further includes a pre-packaged sanitizing wipe and a container to encapsulate the pre-packaged sanitizing wipe 36 and the stretchable hygienic cover 22, and the tray table cover 40, wherein the stretchable hygienic cover 22 and the tray table cover 40 are compressed.

The non-mesh fabric disclosed in the kit further defines a form-fitting fabric, wherein the stretchable form-fitting fabric allows for configurability to geometries of various headrests 122 larger than that of the dimensions of an unstretched hygienic cover 22 and the form-fitting fabric includes elastic materials providing the ability to cling to the existing variable geometry vehicle headrest 122, thereby negating the necessity for straps and clips.

Further, the form-fitting fabric defines a front side 14, back side 16, top side 18, bottom side 10, left side 17A, and right side 17B, and thereby creating an interior surface 12 surrounding a cavity, wherein an existing variable geometry vehicle headrest 122 may occupy the space therein.

Lastly, the invention provides a method for a hygienic kit for a hygienic seat location, comprising the steps of providing a stretchable antimicrobial hygienic cover 22, for utilization with an existing variable geometry vehicle headrest 122, having an ability to conform itself to dimensions of the existing variable geometry vehicle headrest 122 underlying the stretchable hygienic cover 22 when engaged, wherein the stretchable hygienic cover 22 comprises a stretchable, antimicrobial, non-mesh fabric, an elastic opening 35 in the back surface 16 allowing the fabric to stretchily fit over an existing variable geometry vehicle headrest 122, wherein the elastic opening 35 may stretch and retract in size to grip on to an existing variable geometry vehicle headrest 122. The method further discloses using the non-mesh fabric to act as a barrier between a variable geometry headrest 122 and a user's scalp. Next, the method discloses providing a pre-packaged sanitizing wipe 36. The method also includes providing a tray table cover 40 wherein said tray table cover 40 is defined by a top panel 42, a bottom panel 44, and a sidewall 46 connecting said top panel 42 and said bottom panel 44 along three sides of a square geometry thereby creating an opening 48 to a cavity 50 therein. Lastly, the method includes providing a container 38 to encapsulate the pre-packaged sanitizing wipe 36, the tray table cover 40, and the stretchable hygienic cover 22, wherein the stretchable hygienic cover 22 and the tray table cover 40 are compressed.

The method also includes configuring the stretchable, antimicrobial, fabric as a non-mesh fabric to act as a barrier between a variable geometry headrest and a user's scalp, wherein a plurality of antimicrobial metallic threads 52 are interwoven within said non-mesh fabric, thereby providing said barrier within said non-mesh fabric to stop microorganisms from advancing from an interior surface through to an outer surface of said stretchable antimicrobial hygienic cover, thereby containing said microorganisms to an interior side of said stretchable antimicrobial hygienic cover.

In addition to the steps listed above, the method further includes providing a form-fitting fabric non-mesh fabric, wherein the stretchable form-fitting fabric allows for configurability to geometries of various headrests 122 larger than that of the dimensions of an unstretched hygienic cover 22. In addition, the method includes the steps of including elastic materials in the form-fitting fabric for providing the ability to cling to the existing variable geometry vehicle headrest 122, thereby negating the necessity for straps and clips. The form-fitting fabric thereby defining a front side 14, back side 16, top side 18, bottom side 10, left side 17A, and right side 17B, and thereby creating an interior surface 12 surrounding a cavity, wherein an existing variable geometry vehicle headrest 122 may occupy the space therein.

While there has been shown and described above the preferred embodiment of the instant invention it is to be appreciated that the invention may be embodied otherwise than is herein specifically shown and described and that, within said embodiment, certain changes may be made in the form and arrangement of the parts without departing from the underlying ideas or principles of this invention as set forth in the Claims appended herewith.

I claim:

1. A hygienic kit for a hygienic seat location, comprising:
    a stretchable antimicrobial hygienic cover for utilization with an existing variable geometry vehicle headrest, said stretchable hygienic cover having an ability to conform itself to dimensions of the existing variable geometry vehicle headrest underlying the stretchable hygienic cover when engaged, wherein the stretchable hygienic cover comprises a stretchable, antimicrobial, non-mesh fabric configured to provide a barrier between a user and said existing variable geometry vehicle headrest, an elastic opening in a back surface allowing said fabric to stretchily fit over said existing variable geometry vehicle headrest, wherein said elastic opening configurable to stretch in size to fit over said existing variable geometry headrest and retract in size to grip on to said existing variable geometry vehicle headrest;
    a plurality of antimicrobial metallic threads interwoven within said non-mesh fabric, thereby providing a barrier layer within said non-mesh fabric configured to stop microorganisms from advancing from an interior surface through to an outer surface of said stretchable antimicrobial hygienic cover, thereby containing said microorganisms to an interior side of said stretchable antimicrobial hygienic cover;
    a tray table cover, wherein said tray table cover is defined by a top panel, a bottom panel, and a sidewall connecting said top panel and said bottom panel along three sides of a square geometry thereby creating an opening to a cavity therein;
    a pre-packaged sanitizing wipe; and
    a container to encapsulate the pre-packaged sanitizing wipe and the stretchable hygienic cover, wherein the stretchable hygienic cover is compressed.

2. The hygienic kit for a hygienic seat location as recited in claim 1, wherein the stretchable, antimicrobial, non-mesh fabric further comprises:
    a form-fitting fabric, wherein said form-fitting fabric allows for configurability to geometries of various headrests larger than that of the dimensions of an unstretched hygienic cover;

said form-fitting fabric including elastic materials providing the ability to cling to said existing variable geometry vehicle headrest; and said form-fitting fabric defining a front side, back side, top side, bottom side, left side, and right side, and thereby creating an interior surface surrounding a cavity, wherein an existing variable geometry vehicle headrest may occupy the space therein.

3. The hygienic kit for a hygienic seat location as recited in claim 1, wherein the form-fitting fabric of the antimicrobial hygienic headrest cover is constructed of a unitary fabric.

4. The hygienic kit for a hygienic seat location as recited in claim 1, wherein the elastic opening is defined by a hem around a rim of said opening creating a concentric pocket surrounding means for closure that secure the opening of the stretchable hygienic cover to a back-portion of the existing variable geometry vehicle headrest.

5. The hygienic kit for a hygienic seat location as recited in claim 1, wherein the elastic opening includes a concentric closure means within a concentric pocket around said rim of said opening comprising a concentric elastic band with a higher modulus of elasticity than said stretchable, antimicrobial, non-mesh fabric.

6. The hygienic kit for a hygienic seat location as recited in claim 1, wherein the elastic opening includes a concentric closure means around a rim of said opening comprising a heat-bonded elastic material with a higher modulus of elasticity than said stretchable, antimicrobial, non-mesh fabric.

7. The hygienic kit for a hygienic seat location as recited in claim 1, wherein said plurality of antimicrobial metallic threads comprises a plurality of copper threads.

8. The hygienic kit for a hygienic seat location as recited in claim 1, wherein said plurality of antimicrobial metallic threads comprises a plurality of silver threads.

9. A method for providing a hygienic kit for a hygienic seat location, comprising:
   providing a stretchable antimicrobial hygienic cover for utilization with an existing variable geometry vehicle headrest, the stretchable hygienic cover having an ability to conform itself to dimensions of the existing variable geometry vehicle headrest underlying the stretchable hygienic cover when engaged, wherein the stretchable hygienic cover comprises a stretchable, antimicrobial, breathable moisture-absorbent fabric, an elastic opening in a back surface allowing said fabric to stretchily fit over the existing variable geometry vehicle headrest, wherein said elastic opening may stretch and retract in size to grip on to the existing variable geometry vehicle headrest;
   configuring said stretchable, antimicrobial, fabric as a non-mesh fabric to act as a barrier between a variable geometry headrest and a user's scalp, wherein a plurality of antimicrobial metallic threads are interwoven within said non-mesh fabric, thereby providing said barrier within said non-mesh fabric to stop microorganisms from advancing from an interior surface through to an outer surface of said stretchable antimicrobial hygienic cover, thereby containing said microorganisms to an interior side of said stretchable antimicrobial hygienic cover;
   providing a tray table cover wherein said tray table cover is defined by a top panel, a bottom panel, and a sidewall connecting said top panel and said bottom panel along three sides of a square geometry thereby creating an opening to a cavity therein;
   providing a pre-packaged sanitizing wipe; and
   providing a container to encapsulate the pre-packaged sanitizing wipe and the stretchable hygienic cover, wherein the stretchable hygienic cover is compressed.

10. The method for providing a hygienic kit for a hygienic seat location as recited in claim 9, further comprising:
   selecting a form-fitting fabric as the breathable moisture-absorbent fabric, wherein said stretchable form-fitting fabric allows for configurability to geometries of various headrests larger than that of the dimensions of an unstretched hygienic cover;
   including elastic materials in said form-fitting fabric for providing the ability to cling to said existing variable geometry vehicle headrest; and
   said form-fitting fabric defining a front side, back side, top side, bottom side, left side, and right side, and thereby creating an interior surface surrounding a cavity, wherein an existing variable geometry vehicle headrest may occupy the space therein.

11. The method for providing a hygienic kit for a hygienic seat location as recited in claim 9, wherein said plurality of antimicrobial metallic threads comprises a plurality of copper threads.

12. The method for providing a hygienic kit for a hygienic seat location as recited in claim 9, wherein said plurality of antimicrobial metallic threads comprises a plurality of silver threads.

13. A hygienic cover for a headrest, comprising:
   a stretchable antimicrobial hygienic cover for utilization with an existing variable geometry vehicle headrest, said stretchable hygienic cover having an ability to conform itself to dimensions of the existing variable geometry vehicle headrest underlying the stretchable hygienic cover when engaged, wherein the stretchable hygienic cover comprises a stretchable, antimicrobial, non-mesh fabric configured to provide a barrier between a user and said existing variable geometry vehicle headrest, an elastic opening in a back surface allowing said fabric to stretchily fit over said existing variable geometry vehicle headrest, wherein said elastic opening configurable to stretch in size to fit over said existing variable geometry headrest and retract in size to grip on to said existing variable geometry vehicle headrest; and
   a plurality of antimicrobial metallic threads interwoven within said non-mesh fabric, thereby providing a barrier layer within said non-mesh fabric configured to stop microorganisms from advancing from an interior surface through to an outer surface of said stretchable antimicrobial hygienic cover, thereby containing said microorganisms to an interior side of said stretchable antimicrobial hygienic cover.

14. The hygienic cover for a headrest, as recited in claim 13, wherein said plurality of antimicrobial metallic threads comprises a plurality of copper threads.

15. The hygienic cover for a headrest, as recited in claim 13, wherein said plurality of antimicrobial metallic threads comprises a plurality of silver threads.

* * * * *